United States Patent
Kobayashi et al.

(10) Patent No.: US 9,110,336 B2
(45) Date of Patent: Aug. 18, 2015

(54) LIQUID CRYSTAL DISPLAY DEVICE

(71) Applicant: Japan Display Inc., Tokyo (JP)

(72) Inventors: Setsuo Kobayashi, Mobara (JP); Sumito Ueta, Shirako-machi (JP)

(73) Assignee: JAPAN DISPLAY INC., Tokyo (JP)

( * ) Notice: Subject to any disclaimer, the term of this patent is extended or adjusted under 35 U.S.C. 154(b) by 60 days.

(21) Appl. No.: 13/721,316

(22) Filed: Dec. 20, 2012

(65) Prior Publication Data

US 2013/0162939 A1    Jun. 27, 2013

(30) Foreign Application Priority Data

Dec. 22, 2011    (JP) .................................. 2011-281067

(51) Int. Cl.
*G02F 1/1333*    (2006.01)
*G02F 1/1339*    (2006.01)
*G02F 1/1341*    (2006.01)

(52) U.S. Cl.
CPC .......... *G02F 1/13394* (2013.01); *G02F 1/1339* (2013.01); *G02F 1/133305* (2013.01); *G02F 2001/13415* (2013.01)

(58) Field of Classification Search
CPC ..................... G02F 1/1339; G02F 2001/13415; G02F 1/13394
USPC ....................................................... 349/156
See application file for complete search history.

(56) References Cited

U.S. PATENT DOCUMENTS

| | | | |
|---|---|---|---|
| 7,248,328 B1 | 7/2007 | Shibahara | |
| 2007/0121051 A1* | 5/2007 | Yokoyama et al. | 349/156 |
| 2008/0174725 A1* | 7/2008 | Fujimori et al. | 349/106 |
| 2008/0309838 A1 | 12/2008 | Fukuoka et al. | |
| 2009/0237602 A1* | 9/2009 | Kubota et al. | 349/122 |

(Continued)

FOREIGN PATENT DOCUMENTS

| | | |
|---|---|---|
| CN | 1963611 A | 5/2007 |
| JP | 2001-117103 | 4/2001 |

(Continued)

OTHER PUBLICATIONS

Office Action issued by Korean Patent Office on Nov. 14, 2014 regarding a counterpart Korean patent application No. 10-2012-0145183.

(Continued)

*Primary Examiner* — Michael Caley
*Assistant Examiner* — Edmond Lau
(74) *Attorney, Agent, or Firm* — Lowe Hauptman & Ham, LLP

(57) ABSTRACT

Columnar spacers are formed on a TFT substrate where a TFT circuit layer is formed. The TFT circuit layer has a TFT and a pixel electrode. A spacing between the TFT substrate and a counter substrate having a color filter, a black matrix, and an overcoat film is controlled by columnar spacers. The columnar spacers are inserted into an overcoat film formed on the counter substrate. Thus, the counter substrate and the TFT substrate are protruded inward. The substrates protruded inward are unlikely to be deformed. When an external pressure is applied or the front window or the like is bonded to the liquid crystal display panel with resin, the counter substrate is unlikely to be deformed by a stress applied by shrinkage on resin curing. Moreover, the number of columnar spacers can be properly set, thereby preventing the occurrence of low-temperature air bubbles.

8 Claims, 8 Drawing Sheets

(56) References Cited

U.S. PATENT DOCUMENTS

| | | | |
|---|---|---|---|
| 2011/0007251 A1* | 1/2011 | Yamamoto et al. | 349/108 |
| 2011/0204361 A1* | 8/2011 | Nishiki et al. | 257/52 |
| 2011/0227867 A1* | 9/2011 | Ogawa et al. | 345/174 |
| 2011/0242468 A1* | 10/2011 | Choi et al. | 349/129 |

FOREIGN PATENT DOCUMENTS

| | | |
|---|---|---|
| JP | 2004078226 A | 3/2004 |
| JP | 2005037466 A | 2/2005 |
| JP | 2005284253 A | 10/2005 |
| JP | 2008-309857 | 12/2008 |
| JP | 2009086077 A | 4/2009 |
| JP | 2010122258 A | 6/2010 |
| JP | 2011107434 A | 6/2011 |
| WO | 2005038518 A1 | 4/2005 |

OTHER PUBLICATIONS

Office Action issued by Japanese Patent Office on Feb. 24, 2015 regarding a counterpart Japanese patent application No. 2011-281067.

Office Action issued by Chinese Patent Office on Jan. 4, 2015 regarding a counterpart Chinese patent application No. 201210543917.7.

* cited by examiner

FIG. 7

COLUMNAR SPACER AREA RATIO × COLUMNAR SPACER UPPER DIAMETER

| COLUMNAR SPACER AREA RATIO \ COLUMNAR SPACER | 3 | 4 | 5 | 6 | 7 | 8 | 9 | 10 |
|---|---|---|---|---|---|---|---|---|
| 0.001 | 0.003 | 0.004 | 0.005 | 0.006 | 0.007 | 0.008 | 0.009 | 0.01 |
| 0.002 | 0.006 | 0.008 | 0.01 | 0.012 | 0.014 | 0.016 | 0.018 | 0.02 |
| 0.003 | 0.009 | 0.012 | 0.015 | 0.018 | 0.021 | 0.024 | 0.027 | 0.03 |
| 0.004 | 0.012 | 0.016 | 0.02 | 0.024 | 0.028 | 0.032 | 0.036 | 0.04 |
| 0.005 | 0.015 | 0.02 | 0.025 | 0.03 | 0.035 | 0.04 | 0.045 | 0.05 |
| 0.006 | 0.018 | 0.024 | 0.03 | 0.036 | 0.042 | 0.048 | 0.054 | 0.06 |
| 0.007 | 0.021 | 0.028 | 0.035 | 0.042 | 0.049 | 0.056 | 0.063 | 0.07 |
| 0.008 | 0.024 | 0.032 | 0.04 | 0.048 | 0.056 | 0.064 | 0.072 | 0.08 |
| 0.009 | 0.027 | 0.036 | 0.045 | 0.054 | 0.063 | 0.072 | 0.081 | 0.09 |
| 0.010 | 0.03 | 0.04 | 0.05 | 0.06 | 0.07 | 0.08 | 0.09 | 0.1 |
| 0.011 | 0.033 | 0.044 | 0.055 | 0.066 | 0.077 | 0.088 | 0.099 | 0.11 |
| 0.012 | 0.036 | 0.048 | 0.06 | 0.072 | 0.084 | 0.096 | 0.108 | 0.12 |
| 0.013 | 0.039 | 0.052 | 0.065 | 0.078 | 0.091 | 0.104 | 0.117 | 0.13 |
| 0.014 | 0.042 | 0.056 | 0.07 | 0.084 | 0.098 | 0.112 | 0.126 | 0.14 |

ATMOSPHERE OF REDUCED PRESSURE

ATMOSPHERE OF REDUCED PRESSURE

ATMOSPHERIC PRESSURE

LIQUID CRYSTAL DISPLAY DEVICE

CLAIM OF PRIORITY

The present application claims priority from Japanese Patent Application JP 2011-281067 filed on Dec. 22, 2011, the content of which is hereby incorporated by reference into this application.

FIELD OF THE INVENTION

The present invention relates to a display device, and particularly relates to a liquid crystal display device devised to prevent color irregularity caused by gap variations between substrates, the liquid crystal display device being filled with liquid crystals by one drop fill.

BACKGROUND OF THE INVENTION

A liquid crystal display device includes a TFT substrate on which pixel electrodes and thin-film transistors (TFTs) or the like are formed in a matrix form, and a counter substrate opposed to the TFT substrate with a color filter or the like formed in alignment with the pixel electrodes on the TFT substrate. Liquid crystals are interposed between the TFT substrate and the counter substrate. An image is formed by controlling the light transmittance of liquid crystal molecules for each pixel.

A spacing (cell gap) between the TFT substrate and the counter substrate is accurately controlled by columnar spacers. Japanese Unexamined Patent Application Publication No. 2008-309857 describes a configuration in which first columnar spacers are always in contact with a counter substrate, and second columnar spacers come into contact with the counter substrate when a pressure is applied to the counter substrate. The first columnar spacers and the second columnar spacers are identical in height. The shape of a black matrix on the counter substrate keeps the first columnar spacers in contact with the counter substrate. With this configuration, the first columnar spacers keep the cell gap and prevent air bubbles at low temperatures while the second spacers control a pressure applied to a substrate surface.

Japanese Unexamined Patent Application Publication No. 2001-117103 describes a configuration in which the contact area of columnar spacers with a counter substrate is 0.05% to 0.15% in each pixel area, thereby simultaneously preventing cell gap variations and white spots appearing in the lower parts of the surfaces of a raised liquid crystal display panel.

SUMMARY OF THE INVENTION

There has been a demand for sets of liquid crystal display devices with reduced outside dimensions and screens of a constant size; meanwhile, there has been a strong demand for liquid crystal display panels reduced in thickness. Produced liquid crystal display panels are reduced in thickness by externally grinding the outer surfaces of the panels.

Liquid crystal display panels reduced in thickness disadvantageously have a low mechanical strength. A mechanical pressure applied to the display surface of a liquid crystal display panel may break the liquid crystal display panel. In order to prevent such a break, when a liquid crystal display panel is assembled into a set, e.g., a cell phone, a front window is attached to the screen of the liquid crystal display panel with an adhesive or an adhesive sheet. A touch panel may be provided between the front window and the liquid crystal display panel.

FIG. 8 is a plan view illustrating a liquid crystal display device used for cell phones and so on. In FIG. 8, a front window 10 is disposed on a surface of the liquid crystal display device. A black frame print 11 is provided around the front window 10, and a display area 20 is provided inside the black frame print 11. In FIG. 8, the liquid crystal display panel disposed under the front window 10 is smaller in size than the front window 10 and thus is not illustrated in FIG. 8. On the left side of FIG. 8, a flexible circuit board 30 and a backlight flexible circuit board 31 are extended and connected to the liquid crystal display panel.

In FIG. 8, a yellow portion 21 appears around the display area 20, that is, inside the black frame print 11. As will be described later, the yellow portion 21 is caused by an increased clearance between a TFT substrate 100 and a counter substrate 200 in the liquid crystal display panel.

FIG. 9 is a cross-sectional view taken along line B-B of FIG. 8. In FIG. 9, a liquid crystal layer 60 is interposed between the TFT substrate 100 and the counter substrate 200. The liquid crystal layer 60 is sealed with a sealant 150 formed on the edges of the TFT substrate 100 and the counter substrate 200. A lower polarizing plate 110 is bonded to the underside of the TFT substrate 100 while an upper polarizing plate 210 is bonded to the top surface of the counter substrate 200.

The front window 10 is bonded onto the upper polarizing plate 210 via an adhesive 50. The underside of the front window 10 is surrounded by the black frame print 11. The adhesive 50 is a UV curing resin. The UV curing resin is initially a liquid containing, for example, an acrylic oligomer of 27% to 30%. Additionally, a UV reactive monomer and an acrylic resin containing an add-in material for photo polymerization may be used. In this case, the adhesive can be about several μm to 100 μm in thickness.

The UV curing resin 50 shrinks upon curing. The adhesive 50 shrinks upon curing in the directions of arrows in FIG. 10 so as to apply a stress to a liquid crystal display panel, particularly to the counter substrate 200, causing distortion as illustrated in FIG. 10. Even if the adhesive is replaced with an adhesive sheet or the like, the same problem occurs.

FIG. 10 is a schematic diagram illustrating the influence of shrinkage on curing of the UV curing resin 50. The upper polarizing plate 210 and the lower polarizing plate 110 are omitted in the schematic diagram of FIG. 10. In FIG. 10, arrows indicate the directions of shrinkage on curing of the UV curing resin 50.

The shrinkage on curing of the UV curing resin deforms the counter substrate 200 of the liquid crystal display panel as illustrated in FIG. 10. Thus, a deformed portion on the counter substrate 200 increases a spacing between the counter substrate 200 and the TFT substrate 100. For example, a spacing g1 between the counter substrate 200 and the TFT substrate 100 is 4 μm, whereas a spacing g2 increased by the deformation of the counter substrate 200 is 4.4 μm. Thus, the yellow portion 21 appears around the substrate as shown in FIG. 8.

In the case where the counter substrate has a large thickness and sufficient strength, such a stress applied by the adhesive is unlikely to cause the distortion of FIG. 10. Moreover, the deformation of the counter substrate 200 in FIG. 10 is unlikely to occur in a liquid crystal display panel formed by vacuum filling of liquid crystals in FIGS. 11A to 11C. In the vacuum filling of liquid crystals in FIGS. 11A to 11C, after the filling of liquid crystals into the liquid crystal display panel, the liquid crystals are partially pressed out of the liquid crystal display panel by an external force F as illustrated in FIG. 11A. As illustrated in FIG. 11B, a sealant is then applied while the external force F is kept. The external force F is then removed to seal a cell with the sealant placed in the cell as illustrated in FIG. 11C. Thus, the TFT substrate 100 and the counter substrate 200 are protruded inward. The TFT substrate 100 and the counter substrate 200 protruded inward are resistant to deformation illustrated in FIG. 10.

Liquid crystals 60 are applied by one drop fill (ODF). As illustrated in FIG. 12A, an accurately controlled amount of liquid crystals 70 is dropped in the counter substrate 200 with the sealant 150, and then the TFT substrate 100 and the counter substrate 200 are bonded to each other. The filling rate of liquid crystals in ODF is higher than that of vacuum filling. As illustrated in FIG. 12B, the TFT substrate 100 or the counter substrate 200 remains flat without being protruded inward. Hence, the counter substrate 200 is likely to be deformed as illustrated in FIG. 10. Particularly, in the case where the TFT substrate 100 or the counter substrate 200 is reduced in thickness to 0.15 mm or 0.2 mm by grinding, a configuration filled with liquid crystals by ODF is likely to be deformed as shown in FIG. 10 and a yellow portion is likely to appear on the edge of the screen.

Variations in the thickness of a liquid crystal layer due to the deformation of the counter substrate 200 and the TFT substrate 100 can be suppressed by increasing the density of columnar spacers. However, as the density of the columnar spacers increases, the liquid crystal layer contains so-called low-temperature air bubbles when the liquid crystal display panel is left at low temperatures. Since the low-temperature air bubbles disable display, the liquid crystal display device is defective.

The present invention suppresses substrate deformation to prevent defects caused by variations in the thickness of a liquid crystal layer, e.g., a yellow portion appearing around a display area in a liquid crystal display device including a liquid crystal display panel filled with liquid crystals by ODF. Moreover, the present invention prevents the occurrence of low-temperature air bubbles.

The present invention has been devised to solve the problems and has specific configurations: a TFT substrate including a pixel having a pixel electrode and a TFT and a counter substrate including a color filter are bonded to each other with a sealant, liquid crystals are applied into the substrates, a lower polarizing plate is bonded to the TFT substrate, and an upper polarizing plate is bonded to the counter substrate, the liquid crystal display device further including a first substrate bonded to the upper polarizing plate of the liquid crystal display panel with UV resin, wherein the liquid crystal display panel is of IPS type, the liquid crystals are applied into the liquid crystal display panel by ODF, the TFT substrate has columnar spacers with an upper diameter of 4 µm to 8 µm, the counter substrate has an overcoat film with a thickness of 1 µm to 3 µm, more preferably, 1.5 µm to 2 µm, and a columnar spacer area ratio×an upper diameter is 0.04 µm to 0.05 µm in the case where the columnar spacer area ratio is defined as (the total area of all the columnar spacers in contact with the counter substrate)/(the area of the display area).

At this point, the central part of the liquid crystal display panel is smaller in thickness than the edge of the liquid crystal display panel. The first substrate is a front window or a touch panel.

According to the present invention, in a liquid crystal display panel filled with liquid crystals by ODF, gap variations between substrates can be suppressed while deformation of a counter substrate can be prevented, achieving a high-quality liquid crystal display device without color irregularity. Moreover, in a liquid crystal display device including a front window provided on a liquid crystal display panel, deformation of a counter substrate can be prevented, thereby eliminating a yellow portion around a display area. Furthermore, any number of columnar spacers can be set, thereby preventing the occurrence of low-temperature air bubbles.

BRIEF DESCRIPTION OF THE DRAWINGS

FIG. 7 is a numerical table indicating a proper range of a columnar spacer area ratio×an upper diameter;

DESCRIPTION OF THE EMBODIMENTS

In a liquid crystal display device, viewing angle characteristics are important. Viewing angle characteristics are phenomena in which a luminance or chromaticity varies between viewing in front of a screen and viewing in a diagonal direction. Excellent viewing angle characteristics are obtained by in plane switching (IPS) in which liquid crystal molecules are operated by a horizontal electric field. A liquid crystal display panel 10 of IPS type is easily affected by the thickness of a liquid crystal layer 40 because of a birefringence mode. Therefore, an embodiment of the present invention is particularly effective in a liquid crystal display device of IPS type. The contents of the present invention will be specifically described below with reference to the embodiment.

First Embodiment

Figure 1:
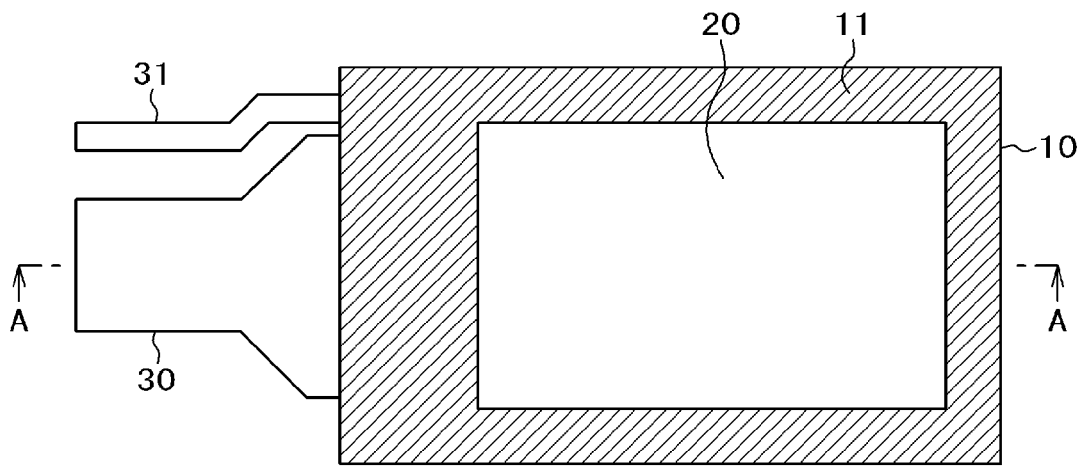
FIG. 1 is a plan view illustrating a liquid crystal display device to which an embodiment of the present invention is applied.
Figure 8:
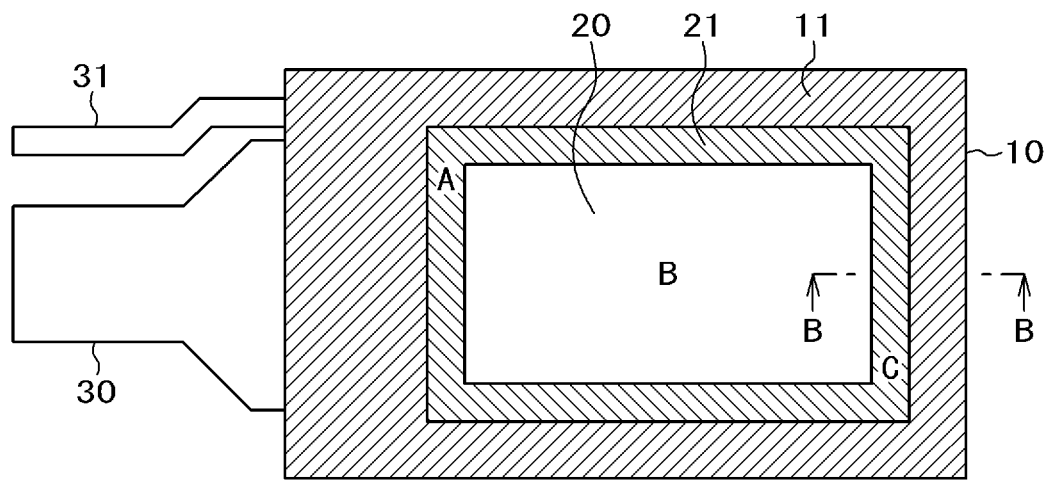
FIG. 8 is a plan view illustrating an example in which a yellow area appears around the display area of a liquid crystal display device according to the related art.
Figure 9:
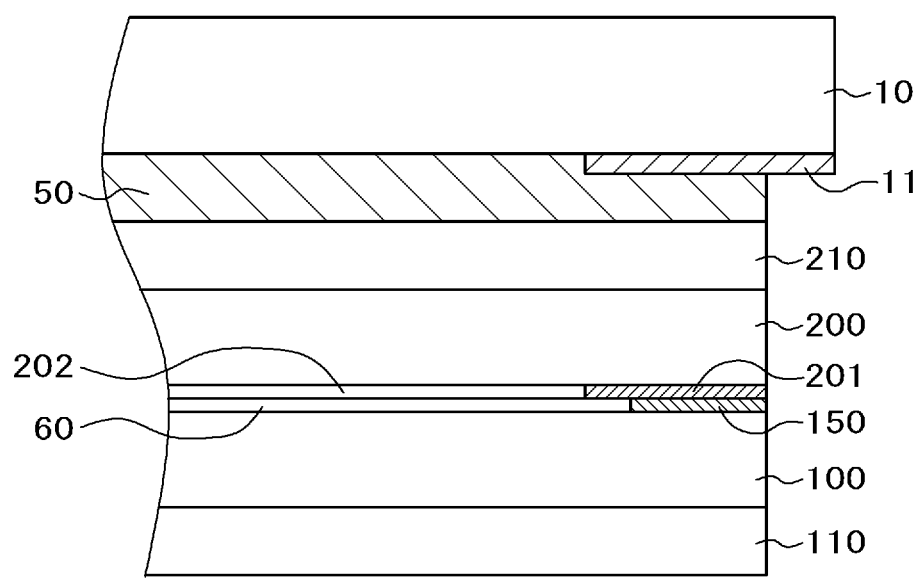
FIG. 9 is a cross-sectional view taken along line B-B of FIG. 8.

FIG. 1 is a plan view illustrating a small-sized liquid crystal display device for a cell phone, etc. to which the embodiment of the present invention is applied. In FIG. 1, a yellow portion around a display area is prevented by the effect of the embodiment of the present invention. Other configurations are identical to those of FIG. 8 and thus the explanation thereof is omitted.

Figure 2:
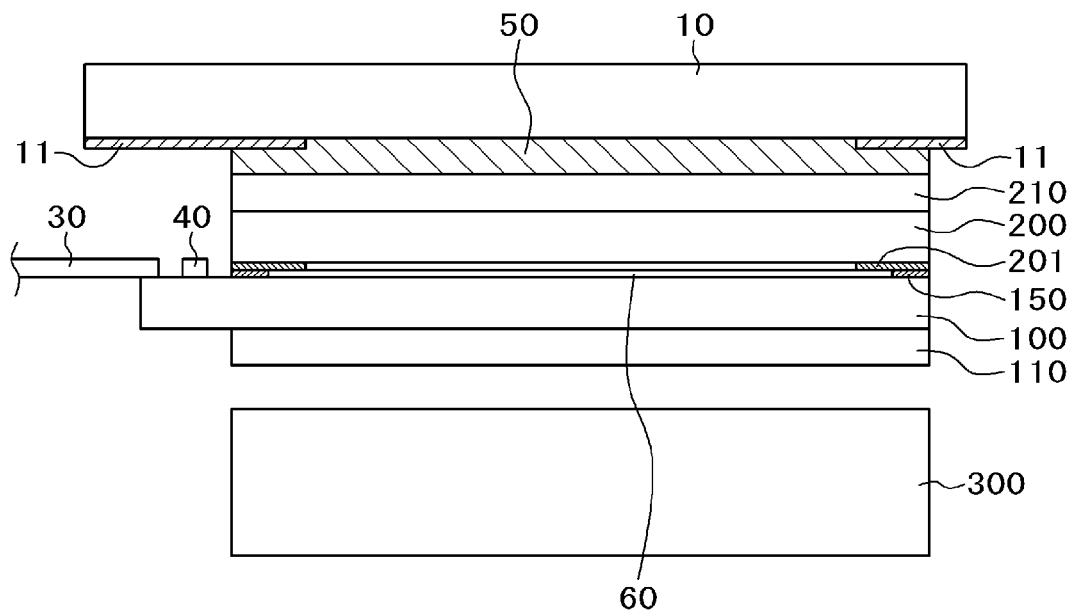
FIG. 2 is a cross-sectional view taken along line A-A of FIG. 1.

FIG. 2 is a cross-sectional view taken along line A-A of FIG. 1. In FIG. 2, a liquid crystal display panel on which a front window 10 is bonded is disposed above a backlight 300. The backlight 300 includes a resin mold accommodating an LED acting as a light source, a light-guide plate, a reflective sheet, a diffusing sheet, and a prism sheet. The liquid crystal display panel is placed on the resin mold.

In FIG. 2, the liquid crystal display panel includes a TFT substrate 100, a counter substrate 200, a lower polarizing plate 110, and an upper polarizing plate 210. A liquid crystal layer is interposed between the TFT substrate 100 and the counter substrate 200 and is sealed with a sealant 150. The TFT substrate 100 and the counter substrate 200 having an initial thickness of 0.5 mm is ground to a thickness of about 0.2 mm.

Liquid crystals are applied by an ODF process. The application of liquid crystals by ODF can be confirmed by the absence of an inlet for liquid crystals in the liquid crystal display panel. In this case, the sealant 150 is formed on the counter substrate 200, liquid crystals are dropped onto the counter substrate 200 by ODF, and then the counter substrate 200 is bonded to the TFT substrate 100. The TFT substrate 100 is larger than the counter substrate 200. A portion provided with the TFT substrate 100 alone has an IC driver 40 and is connected to a flexible circuit board 30.

The front window 10 is bonded to the upper polarizing plate 210 via the adhesive 50 that is an ultraviolet curing resin. The upper polarizing plate 210 is bonded to the counter substrate 200. A black frame print 11 provided around the front window 10. A black matrix 201 is formed around the counter substrate of the liquid crystal display panel, and a display area is provided inside the black matrix. A black matrix formed in the display area is not illustrated.

In FIG. 2, the display area is surrounded by the black matrix of the liquid crystal display panel. Thus, in the present embodiment, an area inside the black frame print of the front window is identical to the display area. In an actual product, however, the inner area of the black frame print may be larger or smaller than the display area. The liquid crystal display panel includes the TFT substrate 100, the counter substrate 200, a liquid crystal layer 60, the sealant 150 on the periphery of the liquid crystal layer, the lower polarizing plate 110 bonded to the TFT substrate 100, and the upper polarizing plate 210 bonded to the counter substrate 200.

In FIG. 2, the TFT substrate 100 and the counter substrate 200 that are made of glass are externally ground to about 0.2 mm. The upper polarizing plate 210 and the lower polarizing plate 110 are 0.13 mm in thickness. The liquid crystal display panel including the polarizing plate 210 bonded to the counter substrate 200 has a total thickness of 0.66 mm.

Figure 10:
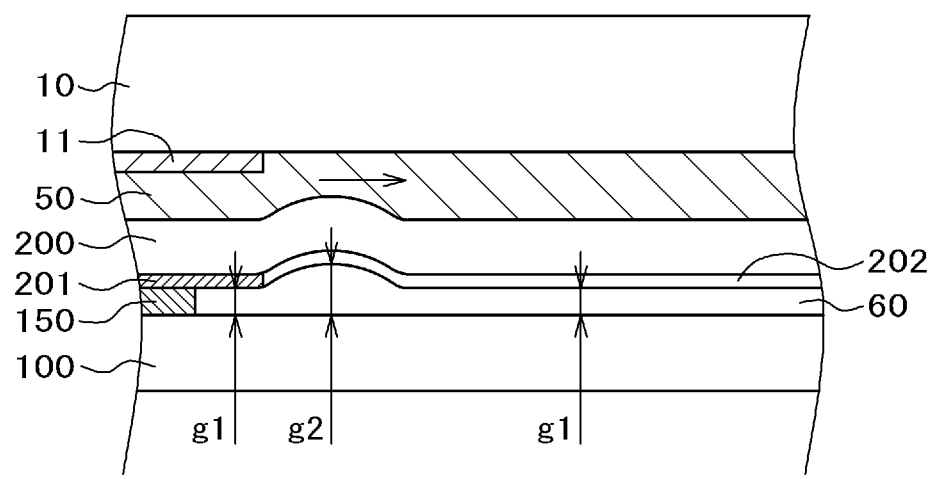
FIG. 10 is a cross-sectional view illustrating a modification of the counter substrate of a liquid crystal display panel.

The liquid crystal display panel and the front window 10 are bonded to each other via the ultraviolet curing resin 50. The ultraviolet curing resin 50 is cured and constricted by ultraviolet irradiation, generating a stress to the counter substrate. In FIG. 2, however, the effect of the embodiment of the present invention prevents the counter substrate from being deformed as illustrated in FIG. 10. The ultraviolet curing resin may be replaced with an adhesive sheet or the like. A touch panel or the like may be provided between the liquid crystal display panel and the front window.

Figure 3:
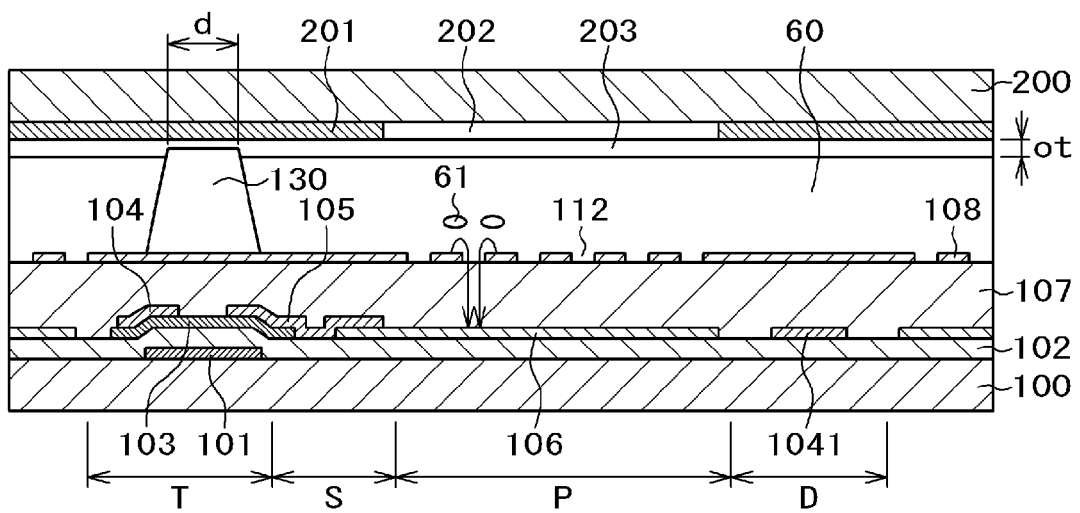
FIG. 3 is a cross-sectional view illustrating the display area in the liquid crystal display device.

FIG. 3 is a cross-sectional view illustrating the display area of FIG. 1. FIG. 3 is a cross-sectional view illustrating a liquid crystal display device, so-called IPS-LITE, to which the present embodiment is applied. The embodiment of the present invention is similarly effective for other kinds of IPS as well as IPS-LITE in FIG. 3. In FIG. 3, a gate electrode 101 is formed on the TFT substrate 100 made of glass. The gate electrode 101 has a two-layer structure to reduce an electric resistance. The lower layer is an Al-based alloy while the upper layer is a Mo-based alloy. The Al-based alloy contains Al components of at least 90% while the Mo-based alloy contains Mo of at least 90%. In the present embodiment, the lower layer contains AlCu while the upper layer contains MoCr. For example, Cu of AlCu is 0.5% while Cr of MoCr is 2.5%. Furthermore, an Al alloy forming the lower layer is AlNd while a metal constituting the upper layer is MoW.

A gate insulating film 102 is formed on the gate electrode 101. A semiconductor layer 103 of a-Si is formed on the gate insulating film 102. A drain electrode 104 and a source electrode 105 are formed on the semiconductor layer 103. A channel portion is formed between the drain electrode 104 and the source electrode 105, which forms a TFT. This kind of TFT is called a bottom-gate-type TFT because a gate electrode 101 is located under the semiconductor layer 103. The source electrode 105 is extended and connected to the area of a pixel electrode 106 that is a transparent electrode made of ITO. In FIG. 3, the pixel electrode is formed as a flat electrode.

In FIG. 3, a video signal line 1041 simultaneously formed with the drain electrode 104 is disposed between the pixel electrodes 106 of the adjacent pixel electrodes 106. The video signal line 1041, the drain electrode 104, and the source electrode 105 are simultaneously formed in the same step. The drain electrode 104 and a drain layer extension line or the like are made of MoCr, MoW, an Al alloy, and so on. An Al alloy is used when the resistance of the video signal line 1041 and so on needs to be reduced.

An inorganic passivation film 107 is formed over the TFT, the pixel electrode 106, and so on. A common electrode 108 having slits 112 is formed on the inorganic passivation film 107. The common electrode 108 is formed as a flat electrode made of ITO, and then the slits 112 are formed so as to face the pixel electrode 106. When a video signal is applied to the pixel electrode 106 through the TFT, electric lines of force are generated between the pixel electrode 106 and the common electrode 108 through the slits 112 to rotate liquid crystal molecules 61, thereby changing the transmittance of the liquid crystal layer 60 so as to form an image. In FIG. 3, T is a TFT region, S is a source electrode region, P is a pixel electrode region, and D is a video signal line region.

In FIG. 3, the counter substrate 200 faces the TFT substrate 100 with the liquid crystal layer 60 interposed between the substrates. A color filter 202 or a black matrix 201 is formed on the counter substrate 200. An overcoat film 203 is formed between the color filter 202 or the black matrix 201 and the liquid crystal layer 60. An alignment film, not shown in FIG. 3, is formed between the common electrode 108 and the liquid crystal layer 60 and between the overcoat film 203 and the liquid crystal layer 60. FIG. 3 illustrates an IPS-type display device including no electrodes between the counter substrate 200 and the liquid crystal layer 60.

In FIG. 3, a columnar spacer 130 is formed on the common electrode 108 of the TFT substrate 100. The columnar spacer 130 is formed by patterning a coating of photosensitive resin such as acryl by photolithography.

The columnar spacer 130 is substantially a truncated cone that is trapezoidal in cross section. In FIG. 3, the upper side of the trapezoid is inserted into the overcoat film 203 of the counter substrate 200, which is a feature of the present invention. The amount of insertion is about 0.1 μm.

Figure 11A:
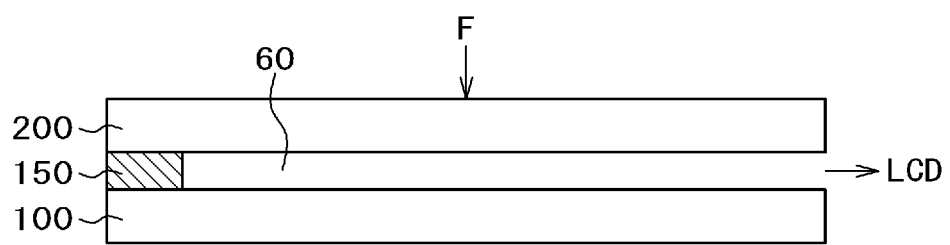
FIGS. 11A to 11C are cross-sectional views illustrating a process of applying liquid crystals by vacuum filling.
Figure 11B:
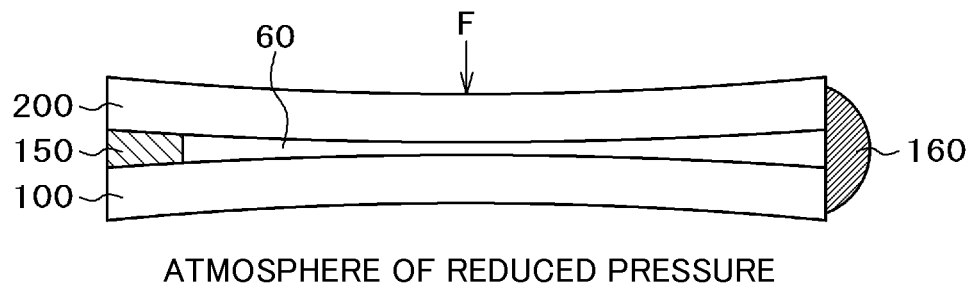
Figure 11C:
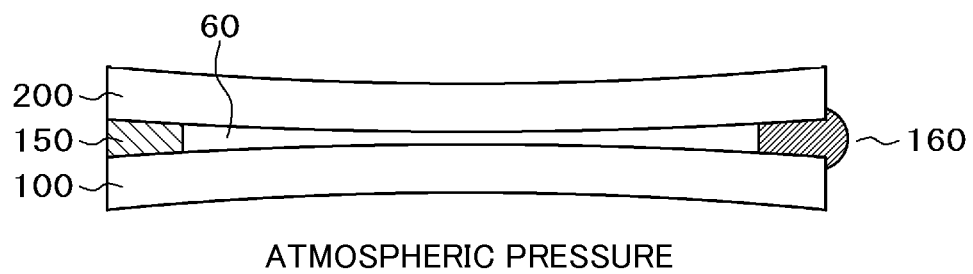
Figure 12A:
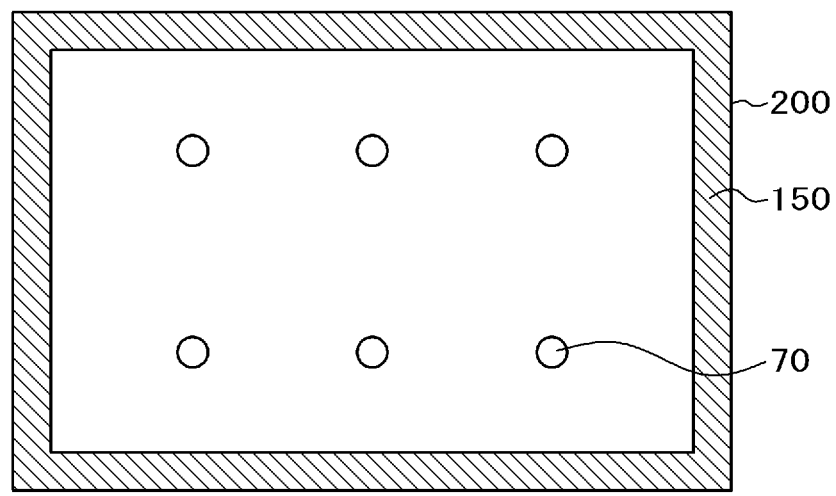
FIGS. 12A and 12B illustrate a process of applying liquid crystals according to one drop fill.
Figure 12B:
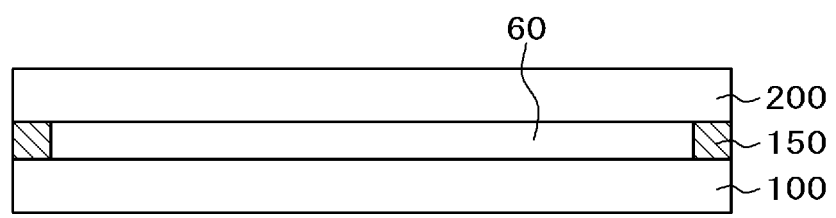

The columnar spacer 130 is inserted into the overcoat film 203 because the liquid crystal display panel filled with liquid crystals by ODF and sealed thereafter has the inwardly protruding substrates as illustrated in FIG. 11C. In other words, the substrates are protruded inward after being filled with liquid crystals, allowing the counter substrate 200 or the TFT substrate 100 to be resistant to deformation. Thus, according to the embodiment of the present invention, even after the filling of liquid crystals by ODF, the columnar spacer 130 is inserted into the overcoat film 203 of the counter substrate 200 by a proper amount, thereby protruding the TFT substrate 100 or the counter substrate 200 inward after the filling of liquid crystals.

For this configuration, in the embodiment of the present invention, the columnar spacers 130 formed on the TFT substrate 100 are in contact with the overcoat film 203 formed on the counter substrate 200. Since the overcoat film 203 is made of a resin, the overcoat film 203 in contact with the columnar spacers 130 with a predetermined pressure is elastically deformed, allowing the columnar spacers 130 to be inserted into the overcoat film 203.

Figure 4:
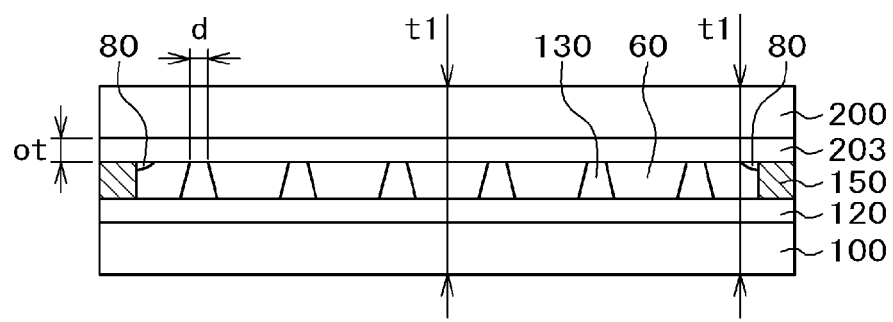
FIG. 4 is a cross-sectional schematic diagram showing the manufacturing process of the liquid crystal display panel according to the embodiment of the present invention.
Figure 5:
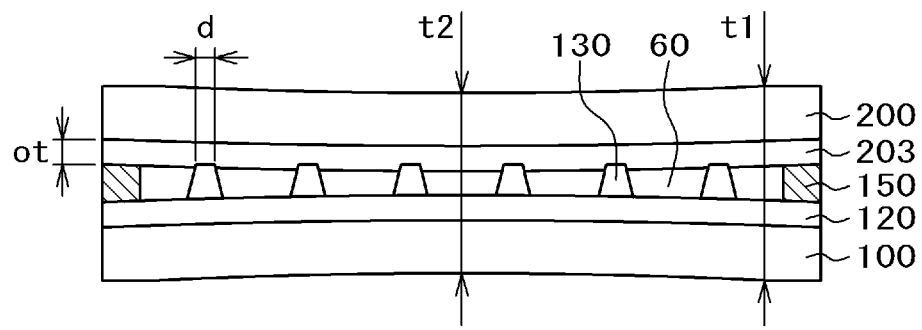
FIG. 5 is a cross-sectional schematic diagram showing the completed liquid crystal display panel according to the embodiment of the present invention.

FIGS. 4 and 5 are schematic diagrams for explaining a process of protruding the counter substrate 200 or the TFT substrate 100 inward after sealing, even after the filling of liquid crystals by ODF according to the embodiment of the present invention. Unlike in FIG. 3, schematic diagrams in FIGS. 4 and 5 do not illustrate a detailed cross-sectional structure.

In FIG. 4, a TFT circuit layer 120 is formed on the TFT substrate 100. The concept of the TFT circuit layer 120 contains the TFT, the pixel electrode, and the common electrode. The columnar spacers 130 are formed on the TFT circuit layer 120, actually, on the common electrode 108. In FIG. 4, the counter substrate 200 faces the TFT substrate 100. The overcoat film 203 is formed on the counter substrate 200. In FIG. 4, the black matrix or the color filter is omitted. A spacing between the counter substrate and the TFT substrate is kept by the columnar spacers.

In FIG. 4, the display panel is filled with liquid crystals by ODF and is sealed with the sealant 150. The filling of liquid crystals by ODF and sealing are performed under a reduced pressure. At this point, a liquid crystal volume is 0.99 to 0.995 with respect to a capacity determined in consideration of the spacing between the TFT substrate 100 and the counter substrate 200 and the columnar spacers 130. Thus, as illustrated in FIG. 4, a small space 80 is formed between the TFT substrate 100 and the counter substrate 200.

Since liquid crystals are applied under a reduced pressure, the space does not contain air, generating no air bubbles. In this state, as illustrated in FIG. 4, the central part and the edge of the liquid crystal display panel are kept constant at t1. In other words, the TFT substrate 100 and the counter substrate 200 are flat substrates.

FIG. 5 is a cross-sectional view illustrating a state in which the liquid crystal display panel in FIG. 4 is installed in the atmosphere. In FIG. 5, the TFT substrate and the counter substrate are pressed by the atmosphere, causing the central part of the liquid crystal display panel to have a thickness t2 smaller than the thickness t1 of the edge of the liquid crystal display panel. In other words, the TFT substrate 100 and the counter substrate 200 are protruded inward. Thus, the TFT substrate 100 and the counter substrate 200 are unlikely to be deformed by a stress. A difference between t1 and t2 is small, e.g., 1 µm or less.

Such a state can be obtained by the following mechanism: the sealant 150 formed on an end for bonding the TFT substrate 100 and the counter substrate 200 also contains spacers. These spacers do not change a spacing between the TFT substrate 100 and the counter substrate 200 depending upon a pressure applied to the TFT substrate 100 or the counter substrate 200.

The tip end diameter of the columnar spacer 130 is within a predetermined range while the thickness of the overcoat film 203 accepts the insertion of the columnar spacers 130. Hence, the counter substrate 200 or the TFT substrate 100 are pressed by the atmosphere so as to insert the ends of the columnar spacers 130 into the overcoat film 203, varying the spacing between the counter substrate 200 and the TFT substrate 100. Since the influence of the atmosphere is maximized at the central part of the substrate, the TFT substrate 100 and the counter substrate 200 are protruded inward. Moreover, the space 80 formed in the liquid crystal layer in FIG. 4 disappears because the counter substrate 200 and the TFT substrate 100 are protruded inward.

As illustrated in FIG. 5, in order to insert the columnar spacers 130 into the overcoat film 203 by a proper amount, an upper diameter d of the columnar spacer 130 and a thickness ot of the overcoat film 203 need to be properly set. The thickness ot of the overcoat film 203 is 1.0 µm to 3.0 µm, and more preferably, 1.5 µm to 2.0 µm. When the thickness ot of the overcoat film is 1.0 µm or less, the elastic effect of the overcoat film 203 is eliminated. When the thickness ot of the overcoat film is 3.0 µm or more, it is difficult to form the overcoat film 203 with an even thickness particularly on a large substrate.

The upper diameter d of the columnar spacer 130 is desirably 4 µm to 8 µm. When the upper diameter is 4 µm or less, the columnar spacer 130 may be buckled by an external pressure. When the upper diameter is 8 µm or more, the columnar spacers 130 may become less capable of penetrating into the overcoat film 203. However, in the case where the overcoat film 203 is improved to a material less subjected to buckling, the upper diameter may be 4 µm or less.

Figure 6:
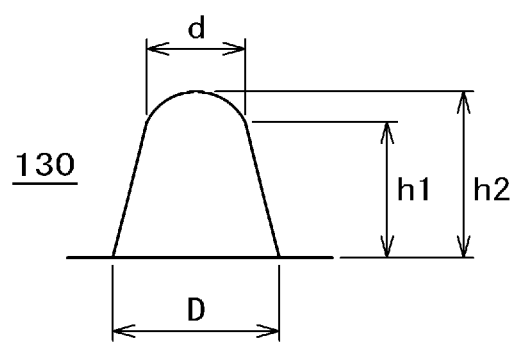
FIG. 6 illustrates an example of the cross section of a columnar spacer.

The columnar spacer 130 may not be accurately trapezoidal in cross section. FIG. 6 illustrates an example of the cross section of the columnar spacer 130. In FIG. 6, the end of the columnar spacer 130 is not flat but is protruded upward. In this case, the upper diameter of the columnar spacer 130 may be d at a height h1 that is 90% of a height h2 of the columnar spacer 130. In the example of FIG. 6, the upper diameter d and a lower diameter D in the cross section of the columnar spacer 130 have the relationship of D=1.5×d.

In the setting of the columnar spacer 130, a strength relative to an external surface pressure and the occurrence of low-temperature air bubbles need to be taken into consideration. In this case, the area ratio of the columnar spacer 130 has an important factor. The area ratio of the columnar spacer is the ratio of the contact area of the end of the columnar spacer 130 and a pixel area. According to the embodiment of the present invention, the ends of the columnar spacers 130 are inserted into the overcoat film 203 in proportion to an external pressure. Thus, the factor of the upper diameter d is also important.

Thus, in the embodiment of the present invention, a parameter of a columnar spacer area ratio×an upper diameter is introduced. This parameter is set within a predetermined range to obtain resistance to low-temperature air bubbles, a strength against a pressure applied to the substrate, and resistance to a stress generated during shrinkage on curing of UV curing resin. When the area ratio of the columnar spacer is 0.4% or less, the strength against a pressure applied to the substrate is not sufficient. When the area ratio of the columnar spacer is at least 1.3%, low-temperature air bubbles may appear. In the present specification, a columnar spacer area ratio is defined as (the total area of all the columnar spacers in contact with the counter substrate in a predetermined region of the display area)/(the area of the predetermined region).

In the case where the upper diameter of the columnar spacer 130 is not in the range of 4 µm to 8 µm, the counter substrate 200 and the TFT substrate 100 cannot be kept protruded inward while keeping a proper pressing strength of the substrate. Thus, the counter substrate 200 is deformed by the stress of shrinkage on curing of the UV adhesive 50, causing irregularity in the thickness of the liquid crystal layer 60 and a yellow portion around the display area.

FIG. 7 is a numerical table indicating the range of a columnar spacer area ratio×an upper diameter to solve the above problem. In FIG. 7, the horizontal axis represents an upper diameter of the columnar spacer 130 while the vertical axis represents an area ratio of the columnar spacers. The proper range of a columnar spacer area ratio×an upper diameter is surrounded by a thick line in FIG. 7, that is, from 0.04 μm to 0.05 μm.

The setting of a columnar spacer area ratio×an upper diameter in this range can suppress deformation caused by a stress applied during curing for bonding the front window or the like with UV curing resin, without gap variations caused by the buckling of the columnar spacers 130 or low-temperature air bubbles.

In the above explanation, the columnar spacers are inserted into the overcoat film. In the absence of the overcoat film, the columnar spacers may be inserted into the resin black matrix or the color filter without departing from the scope of the present invention. Furthermore, as described above, the spacers are also provided in the sealant. In the case where the overcoat film is extended into the sealant, the amount of insertion of the spacer in the sealant is smaller than the amount of insertion in the display area. Moreover, in the case where the overcoat film is not extended into the sealant, a material different from that of the overcoat film can be used for portions at the spacers to vary the amount of insertion.

A columnar spacer area ratio is defined as (the total area of all the columnar spacers in contact with the counter substrate in a predetermined region of the display area)/(the area of the predetermined region). The predetermined region may be replaced with the overall display area. The area ratio of the columnar spacer may be varied between the central part and the edge of the display area.

Furthermore, as described above, the embodiment of the present invention is similarly applicable to a liquid crystal display device including a touch panel bonded to a liquid crystal display panel with the UV curing resin 50, or a liquid crystal display device including a touch panel bonded onto a liquid crystal display panel and a front window bonded to the touch panel. The UV curing resin may be replaced with an adhesive sheet.

What is claimed is:

1. A liquid crystal display device comprising a liquid crystal display panel in which a TFT substrate including a pixel having a pixel electrode and a TFT and a counter substrate including a color filter are bonded to each other with a sealant, liquid crystals are applied into the substrates, a lower polarizing plate is bonded to the TFT substrate, and an upper polarizing plate is bonded to the counter substrate, the liquid crystal display device further comprising a first substrate bonded to the upper polarizing plate of the liquid crystal display panel with UV resin, wherein the liquid crystal display panel is of IPS type, the liquid crystals are applied into the liquid crystal display panel by ODF, the TFT substrate has columnar spacers with an upper diameter of 4 μm to 8 μm, the counter substrate has an overcoat film with a thickness of 1 μm to 3 μm, and a columnar spacer area ratio×an upper diameter is 0.04 μm to 0.05 μm in the case where the columnar spacer area ratio is defined as (the total area of all the columnar spacers in contact with the counter substrate)/(an area of the display area).

2. The liquid crystal display device according to claim 1, wherein the liquid crystal display panel has a central part smaller in thickness than an edge of the liquid crystal display panel.

3. The liquid crystal display device according to claim 1, wherein the overcoat film is 1.5 μm to 2 μm in thickness.

4. The liquid crystal display device according to claim 2, wherein the overcoat film is 1.5 μm to 2 μm in thickness.

5. The liquid crystal display device according to claim 1, wherein the first substrate is a front window.

6. The liquid crystal display device according to claim 2, wherein the first substrate is a front window.

7. The liquid crystal display device according to claim 1, wherein the first substrate is a touch panel.

8. The liquid crystal display device according to claim 2, wherein the first substrate is a touch panel.

* * * * *